Jan. 11, 1966  J. T. EVANS ETAL  3,228,525
BUTTON TRAP FOR A LAUNDRY APPLIANCE
Filed Feb. 20, 1962  3 Sheets-Sheet 1
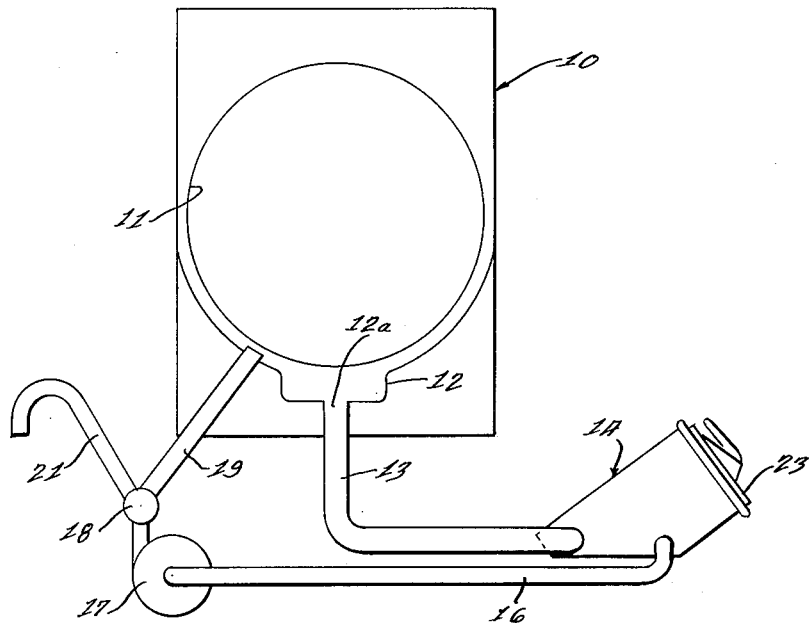
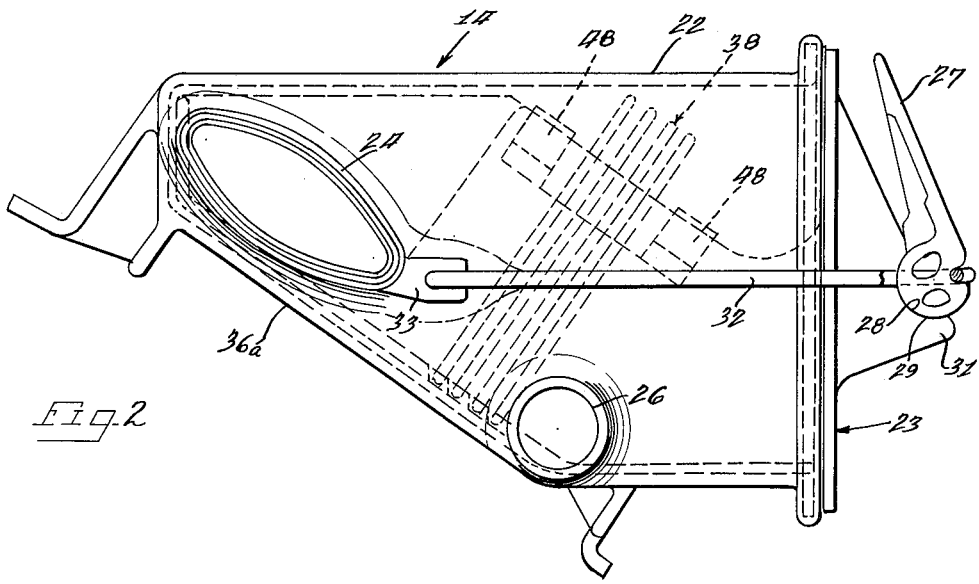
INVENTORS
John T. Evans
BY Warren L. Colby
ATTORNEYS Jan. 11, 1966     J. T. EVANS ETAL     3,228,525
BUTTON TRAP FOR A LAUNDRY APPLIANCE
Filed Feb. 20, 1962     3 Sheets-Sheet 2

INVENTORS
John T. Evans
BY Warren L. Colby
Hill, Sherman, Meroni, Gross & Simpson
ATTORNEYS Jan. 11, 1966  J. T. EVANS ETAL  3,228,525
BUTTON TRAP FOR A LAUNDRY APPLIANCE
Filed Feb. 20, 1962  3 Sheets-Sheet 3
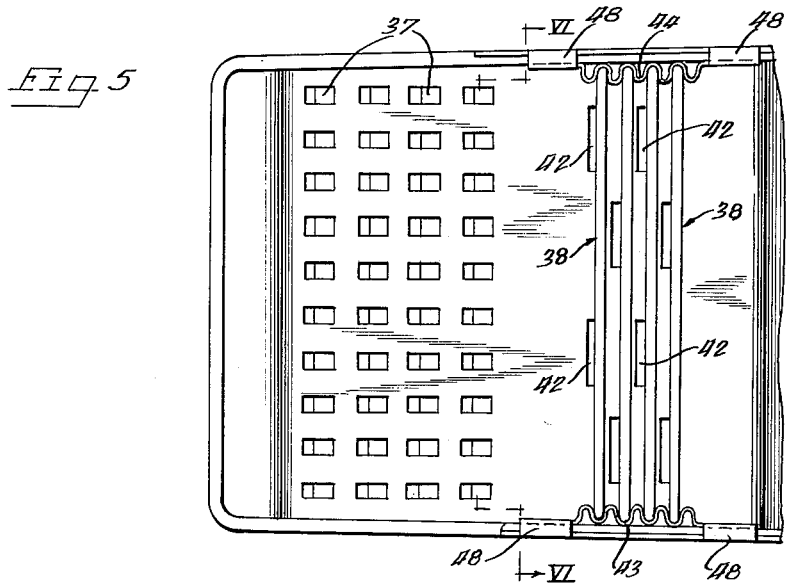
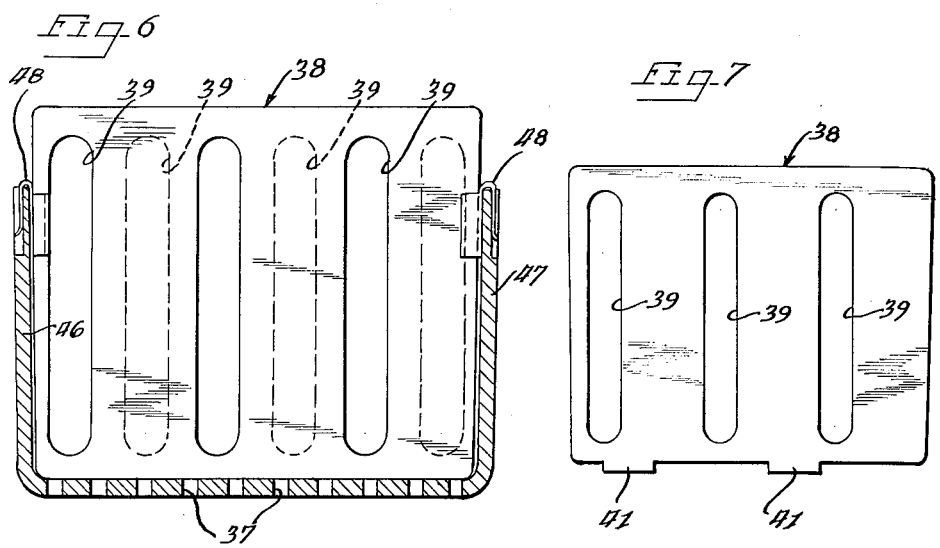
INVENTORS
John T. Evans
Warren L. Colby
BY
ATTORNEYS United States Patent Office 3,228,525
Patented Jan. 11, 1966

3,228,525
BUTTON TRAP FOR A LAUNDRY APPLIANCE
John T. Evans and Warren L. Colby, St. Joseph, Mich., assignors to Whirlpool Corporation, St. Joseph, Mich., a corporation of Delaware
Filed Feb. 20, 1962, Ser. No. 174,620
4 Claims. (Cl. 210—167)

The present invention deals with improvements in laundry equipment and, more specifically, to a device for trapping solid foreign matter from a laundry liquid.

In a typical laundry machine, the laundry liquid collected in the sump is passed through a circulating pump which either returns the liquid to the washing zone or discharges into a drain. The laundry liquid leaving the sump, however, may contain foreign objects such as buttons, coins, hair pins, and the like, which could cause serious damage to the pump if they were allowed to enter the pump inlet. The provision of an improved trap for removing such foreign objects from the laundry liquid is the principal object of the present invention.

Another object of the present invention is to provide a trap including baffles which are readily removable for purposes of cleaning.

Still another object of the invention is to provide an improved inexpensive trap for eliminating foreign matter from a wash liquid.

A further description of the present invention will be made in conjunction with the attached sheets of drawings which illustrate a preferred embodiment thereof.

In the drawings:

FIGURE 1 is a somewhat schematic view of a plumbing diagram for a washing machine assembly incorporating the improved trap of the present invention;

FIGURE 2 is a view in elevation of the trap assembly but in a horizontal position;

FIGURE 5 is a plan view of the drawer illustrated in FIGURE 4;

FIGURE 6 is a cross-sectional view taken substantially along the line VI—VI of FIGURE 5; and FIGURE 7 is a view in elevation of one of the baffle elements making up the trap.

As shown on the drawings:

Figure 3:
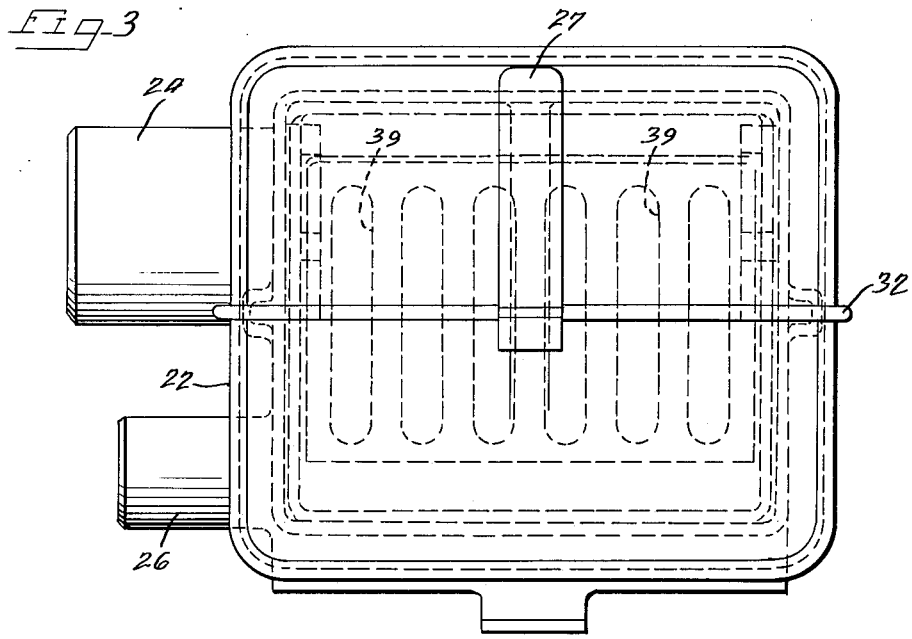
FIGURE 3 is an end elevational view of the trap assembly.

In FIGURE 1, reference numeral 10 indicates generally a washing machine. Although the principles of the present invention are generally applicable to any form of laundry apparatus, the schematically illustrated machine of FIGURE 1 is of the type having a horizontally disposed rotatable drum 11. The washing machine assembly 10 includes a sump 12 which collects wash water drained through the rotatable drum 11, and a discharge line 13 communicating with a sump outlet 12a at the bottom of the sump 12. The sump discharge line 13 feeds a trap assembly, generally indicated at numeral 14 of the drawings, and a discharge line 16 is provided to deliver the discharge of the trap 14 into a pump 17. The discharge of the pump 17 is directed to a valve means 18 which selectively directs the wash liquid either to a conduit 19 which recirculates the wash liquid into the drum 11, or to discharge line 21 which directs the wash water to a suitable drain.

The details of the trap assembly 14 are illustrated in FIGURES 2 to 7, inclusive, of the drawings. The trap assembly includes an outer housing 22 composed of a synthetic resinous material or the like and including a removable drawer structure generally indicated at 23 in the drawings.

It will be understood that the trap assembly will be mounted within the casing of the washing machine 10 with the drawer structure 23 arranged for ready access by the housewife operator whenever it is desired to remove the drawer structure 23 for cleaning the trap.

An inlet 24 is provided for receiving laundry liquid from the sump drain conduit 13, and an outlet 26 is provided to discharge the laundry liquid into the conduit 16.

As best seen in FIGURES 2 and 3, the drawer 23 is releasable locked to the housing 22 by providing a lever 27 having an eccentric camming portion 28 which rides in an arcuate seat 29 formed in a flange 31 extending from the front face of the drawer assembly 23. The lever 27 engages a wire bail 32 whose end portions are received within lugs 33 extending from the housing 22. Thus, when the lever 27 is moved clockwise as viewed in FIGURE 2, the camming surface 28 rides out of the seat 29 so that the bail 32 may be pivoted about its anchoring points, thus freeing the drawer 23 for sliding movement within the housing 22.

Figure 4:
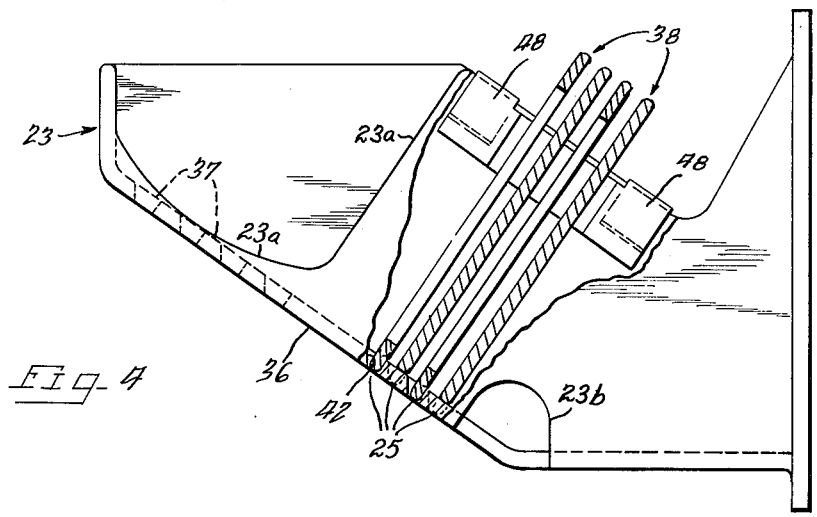
FIGURE 4 is a side elevational view partly broken and partly in section of the removable drawer contained within the trap but in a horizontal position.

The structure of the drawer 23 is best illustrated in FIGURES 4 to 7 of the drawings. The drawer 23 has bottom, side and front walls forming a generally trough-shaped article. Referring to FIGURES 2 and 4, the bottom wall 36 is spaced from the adjoining wall 36a of the housing 22, thereby leaving a space 36b.

The side wall of the drawer 23 nearest the inlet 24 and the outlet 26 of the housing 14 is characterized by a relieved portion 23a in registry with the inlet 24 so that inlet fluid will be directed into the interior of the drawer 23. From these views, it will be seen that the drawer 23 includes a horizontal wall portion 36 having a series of apertures 37 formed therein to permit draining of some of the wash liquid before the liquid contacts the baffle assembly. The apertures 37, of course, are sufficiently small to prevent passage of buttons or other foreign matter into the drain 26. Wash water draining through the apertures 37 runs along a horizontal wall 36a of the housing 22, the two walls being spaced sufficiently to permit this flow.

The side wall of the drawer 23 is also formed with a drawer outlet 23b in register with the housing outlet 26. The drawer outlet 23b, of course, is downstream of the baffles 38. Thus, fluid enters the housing inlet 24, passes into the drawer at the drawer inlet 23a, passes through the apertures 37 in the drawer and through the baffles 38, and exits from the drawer outlet 23b and the housing outlet 26.

The baffle assembly consists of a plurality of individual baffle units illustrated in FIG. 7 of the drawings. In the particular embodiment illustrated in that figure, the baffle 38 includse three elongated slots 39 disposed in unsymmetrical relation across the width of the baffle 38. The baffle 38 is also provided with projections 41 for insertion within slots 42 formed in the horizontal wall 36. The slots 42 are preferably tapered on their leading edge so that the baffles 38 can be easily cammed into position with the projections 41 extending into the slots 42.

The array of baffles 38 is further supported within the drawer 23 by means of a pair of retainers 43 and 44 which are held against side walls 46 and 47 of the drawer 23 by means of spring-type clips 48.

As seen in FIGURE 5, the slots 42 are arranged in rows having a staggered relation between the rows. With this arrangement, each of the baffles 38 can be made identical, but the baffles can only be positioned in one position within the slots. In that one position, the slots 39 formed in the baffles 38 will not be in registry with the slots in the baffle immediately adjacent to it. Specifically the first baffle 38 is inserted in the drawer with its projections 41 seated in the slots 42 of the first row of slots. Then, the next baffle 38 is inserted by turning the baffle 180° so that its projections 41 are received in the second row of slots 42. Thus, when all of the baffles 38 are in position, as illustrated in FIGURES 5 and 6, the slots 39 provide a tortuous path for the laundry liquid passing through the slots 39. Foreign objects such as buttons or the like carried by the wash liquid are unable to negotiate this maze and are therefore collected between the baffles 38. The laundry liquid can then be safely discharged through the outlet 26 and into the conduit 16 for passage to the pump 17. The collected foreign matter can be readily removed by withdrawing the drawer 23 from the housing 22, and removing the baffles 38.

It will be seen that the present invention provides a highly effective means for removing foreign matter which might be transported with the wash liquid. The trap structure is easy to assemble and disassemble, and is economical to manufacture. It should also be evident that various modifications can be made to the described embodiment without departing from the scope of the present invention.

The embodiments of the invention in which an exclusive property or privilege is claimed are defined as follows:

1. A laundry appliance having a liquid circuit including a trap for separating solid foreign matter from laundry liquid in the circuit comprising,
   a housing forming an enclosure open at one end,
      said housing having a side wall formed with an inlet opening and an outlet opening spaced apart from one another and spaced inwardly of said open end,
   a removable drawer inserted in said housing through said open end and comprising
      bottom, front and side walls together forming a generally trough-shaped article sized to have said bottom and side walls spaced from the adjoining walls of said housing,
         one of said side walls of said drawer having a relieved portion forming an inlet recess adapted to be disposed opposite said inlet opening,
   whereby laundry liquid is discharged into the interior of said drawer,
      said bottom wall having a plurality of slots formed therein,
   baffle means having projections extending from the bottom thereof,
   retaining means for attaching said baffle means to the drawer side walls,
      The slots in said bottom wall of said drawer being staggered to receive and mount said baffle means between the side walls of the drawer,
   said baffle means cooperating with said drawer and said housing to form a tortuous restricted flow path extending between said inlet and outlet openings for the liquid flowing through the drawer,
      said one side wall of said drawer having a drawer outlet opening in register with said outlet opening in said housing and downstream of said baffle means,
   and latching means between the housing and said front wall of said drawer to retain said drawer in removable assembly within said housing.

2. A laundry appliance having al iquid circuit including a trap for separating solid foreign matter from laundry liquid in the circuit comprising,
   a housing forming an enclosure open at one end,
      said housing having a side wall formed with an inlet opening and an outlet opening spaced apart from one another and spaced inwardly of said open end,
   a removable drawer inserted in said housing through said open end and comprising
      bottom, front and side walls together forming a generally trough-shaped article sized to have said bottom and side walls spaced from the adjoining walls of said housing,
         one of said side walls of said drawer having a relieved portion forming an inlet recess adapted to be disposed opposite said inlet opening,
   whereby laundry liquid is discharged into the interior of said drawer,
      said bottom wall having a plurality of slots formed therein,
   a plurality of baffles having projections extending from the bottom thereof,
      said baffles having vertically elongated slots disposed in unsymmetrical disposition,
   retaining means for attaching said baffles to the drawer side walls,
      the slots in said bottom wall of said drawer being staggered to receive and mount said baffles between the side walls of the drawer with the slots in the baffles staggered,
   thereby to form a tortuous flow path for the liquid flowing through the drawer,
      said one side wall of said drawer having a drawer outlet opening in register with said outlet opening in said housing and downstream of said baffles,
   and latching means between the housing and said front wall of said drawer to retain said drawer in removable assembly within said housing.

3. A laundry appliance as defined in claim 2,
   said retaining means comprising spring clips and each of said plurality of baffle means being detachably secured to said drawer side walls by said spring clips,
   said baffle means being removable from said drawer to facilitate cleaning of the trap.

4. A laundry appliance as defined in claim 2, and further characterized by said drawer bottom wall having a series of apertures formed therein upstream of said baffles to permit draining of some of the laundry liquid before the liquid contacts the baffles through the space between the walls of the drawer and the housing for discharge from the housing outlet.

References Cited by the Examiner
UNITED STATES PATENTS

| | | |
|---|---|---|
| 419,606 | 1/1890 | Jewell. |
| 1,201,268 | 10/1916 | Davis. |
| 1,648,773 | 11/1927 | Lundborg _____ 210—488 X |
| 2,240,721 | 5/1941 | Selitzky _____ 210—488 X |
| 2,413,954 | 1/1947 | Conterman. |
| 2,554,748 | 5/1951 | Lewis et al. _____ 210—248 X |
| 3,155,614 | 11/1964 | Wendlenner _____ 210—493 X |

FOREIGN PATENTS

| | | |
|---|---|---|
| 366,447 | 7/1906 | France. |
| 869,306 | 11/1941 | France. |

REUBEN FRIEDMAN, *Primary Examiner.*

HERBERT L. MARTIN, *Examiner.*